US012776273B2

(12) United States Patent
Kim et al.

(10) Patent No.: US 12,776,273 B2
(45) Date of Patent: Oct. 27, 2026

(54) DISPLAY DEVICE AND ELECTRONIC DEVICE INCLUDING THE SAME

(71) Applicant: Samsung Display Co., LTD., Yongin-si (KR)

(72) Inventors: Hyunsu Kim, Yongin-si (KR); Youngmin Bae, Yongin-si (KR); Yunki Bae, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 19/195,898

(22) Filed: May 1, 2025

(65) Prior Publication Data

US 2026/0134830 A1 May 14, 2026

(30) Foreign Application Priority Data

Nov. 12, 2024 (KR) ........................ 10-2024-0159829

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2310/0289* (2013.01); *G09G 2310/061* (2013.01); *G09G 2330/023* (2013.01)

(58) Field of Classification Search
None
See application file for complete search history.

(56) References Cited

U.S. PATENT DOCUMENTS

| | | | | |
|---|---|---|---|---|
| 11,798,480 | B2 * | 10/2023 | Han | G09G 3/3258 |
| 2008/0284498 | A1 | 11/2008 | Xu et al. | |
| 2014/0160182 | A1 | 6/2014 | Hong et al. | |
| 2016/0063962 | A1 * | 3/2016 | Park | G09G 3/3666 345/211 |
| 2017/0148390 | A1 * | 5/2017 | Park | G06F 1/3296 |
| 2018/0226017 | A1 * | 8/2018 | Chen | G09G 3/3208 |
| 2019/0172379 | A1 * | 6/2019 | Park | H02M 1/32 |

(Continued)

FOREIGN PATENT DOCUMENTS

| | | | |
|---|---|---|---|
| CN | 117594000 | A | 2/2024 |
| KR | 100416589 | B1 | 2/2004 |

OTHER PUBLICATIONS

Extended European Search Report for European Application No. 25194039.1-1207; Report Mail Date Jan. 28, 2026 (15 Pages).

*Primary Examiner* — Nitin Patel
*Assistant Examiner* — Amen W Bogale
(74) *Attorney, Agent, or Firm* — CANTOR COLBURN LLP

(57) ABSTRACT

A display device includes a display panel including a pixel, a gate driver configured to output a gate signal to the pixel, a data driver configured to apply a data voltage to the display panel, a voltage outputter configured to apply a gate high voltage and a gate low voltage to the gate driver and a driving controller configured to control the gate driver, the data driver and the voltage outputter. The gate signal is generated based on the gate high voltage and the gate low voltage. The driving controller controls a driving frequency of the display panel. The gate low voltage is generated based on a predetermined power voltage. A generation cycle of the predetermined power voltage is controlled based on the driving frequency.

20 Claims, 15 Drawing Sheets

(56) References Cited

U.S. PATENT DOCUMENTS

| | | | | |
|---|---|---|---|---|
| 2019/0334435 | A1* | 10/2019 | Tseng | G09G 3/3208 |
| 2020/0211475 | A1* | 7/2020 | Park | G09G 3/2007 |
| 2021/0280121 | A1* | 9/2021 | Nam | G09G 3/3696 |
| 2024/0046854 | A1* | 2/2024 | Min | G09G 3/3696 |
| 2025/0157417 | A1* | 5/2025 | Ju | H02M 1/0025 |

* cited by examiner

DISPLAY DEVICE AND ELECTRONIC DEVICE INCLUDING THE SAME

This application claims priority to Korean Patent Application No. 10-2024-0159829, filed on Nov. 12, 2024, and all the benefits accruing therefrom under 35 U.S.C. § 119, the content of which in its entirety is herein incorporated by reference.

BACKGROUND

1. Field

Embodiments of the inventive concept relate to a display device and an electronic device. More particularly, embodiments of the inventive concept relate to a display device an electronic device with reduced a power consumption.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver providing a gate signal to the gate lines, a data driver providing a data voltage to the data lines, an emission driver providing an emission signal to the emission lines and a driving controller controlling the gate driver, the data driver and the emission driver.

SUMMARY

Generally, when a charge pump circuit for generating a relatively low power voltage is operated, a power consumption of a display device may be increased.

Embodiments of the inventive concept provide a display device with reduced a power consumption.

Embodiments of the inventive concept also provide an electronic device a with reduced a power consumption.

In an embodiment of the disclosure, a display device may include a display panel including a pixel, a gate driver configured to output a gate signal to the pixel, a data driver configured to apply a data voltage to the display panel, a voltage outputter configured to apply a gate high voltage having a first voltage level and a gate low voltage having a second voltage level lower than the first voltage level to the gate driver and a driving controller configured to control the gate driver, the data driver and the voltage outputter. The gate signal may be generated based on the gate high voltage and the gate low voltage. The driving controller may control a driving frequency of the display panel. The gate low voltage may be generated based on a predetermined power voltage having a predetermined power voltage level. A generation cycle of the predetermined power voltage may be controlled based on the driving frequency.

In an embodiment, when the driving frequency is higher than a reference driving frequency, the generation cycle may be decreased.

In an embodiment, when the driving frequency is lower than a reference driving frequency, the generation cycle may be increased.

In an embodiment, the voltage outputter may include a voltage generating block configured to receive an input power voltage and a cycle control signal, and output the predetermined power voltage based on the input power voltage and the cycle control signal and a voltage converting block configured to output the gate low voltage based on the predetermined power voltage.

In an embodiment, the input power voltage may include a first input power voltage and a second input power voltage. The voltage generating block may include a first switching element including a first terminal receiving the first input power voltage and a second terminal connected to a first node, a second switching element including a first terminal receiving a ground voltage and a second electrode connected to a second node, a third switching element including a first terminal receiving the ground voltage and a second terminal connected to the first node, a first capacitor including a first electrode connected to the first node and a second electrode connected to the second node, a fourth switching element including a first terminal connected to the second node and a second terminal connected to a third node, a fifth switching element including a first terminal receiving the second input power voltage and a second terminal connected to the third node, a sixth switching element including a first terminal receiving the ground voltage and a second terminal connected to a fourth node, a second capacitor including a first electrode connected to the third node and a second electrode connected to the fourth node, a seventh switching element including a first terminal connected to the fourth node and a second terminal connected to a fifth node, a third capacitor including a first electrode connected to the fifth node and a second electrode receiving the ground voltage. The fifth node may output the predetermined power voltage.

In an embodiment, a generation period in which the voltage generating block operates may include a first generation period and a second generation period. In the first generation period, the first capacitor may store the first input power voltage, and the second capacitor may store the second input power voltage. In the second generation period, the second node and the third node may be connected, and the fourth node and the fifth node may be connected. An absolute value of the predetermined power voltage may be a sum of the first input power voltage and the second input power voltage.

In an embodiment, the first input power voltage and the second input power voltage may be positive voltages, and the predetermined power voltage may be a negative voltage.

In an embodiment, the generation cycle may be a length of the generation period. The length of the generation period may be changed based on the driving frequency.

In an embodiment, when the driving frequency is increased, the length of the generation period may be decreased.

In an embodiment, when the driving frequency is decreased, the length of the generation period may be increased.

In an embodiment, the driving frequency may include a first driving frequency and a second driving frequency higher than the first driving frequency. A frame period of the first driving frequency may include an active period in which the data voltage is applied and a blank period in which the applying of the data voltage is stopped. A frame period of the second driving frequency includes the active period. The generation cycle may have a first generation cycle in the active period, and the generation cycle may have a second generation cycle longer than the first generation cycle in the blank period.

In an embodiment, in the active period, an active signal may have an activation level, and in the blank period, the active period may have an inactivation level. When the active signal has the activation level, the generation cycle may have the first generation cycle. When the active signal has the inactivation level, the generation cycle may have the second generation cycle.

In an embodiment, in the active period, an active signal may have an activation level, and in the blank period, the active period may have an inactivation level. The frame period of the first driving frequency may include first to fourth periods. In the first period, the active signal may have the activation level, and the generation cycle may have the second generation cycle. In the second period following the first period, the active signal may have the activation level, and the generation cycle may have the first generation cycle. In the third period following the second period, the active signal may have the inactivation level, and the generation cycle may have the first generation cycle. In the fourth period following the third period, the active signal may have the activation level, and the generation cycle may have the second generation cycle.

In an embodiment of the disclosure, a display device may include a display panel including a pixel, a gate driver configured to output a gate signal to the pixel, a data driver configured to apply a data voltage to the display panel, a voltage outputter configured to apply a gate high voltage and a gate low voltage to the gate driver and a driving controller configured to control the gate driver, the data driver and the voltage outputter. The gate signal may be generated based on the gate high voltage and the gate low voltage. A frame period in which the pixel is driven may include an active period in which the data voltage is applied to the pixel and a blank period in which an applying of the data voltage is stopped. In the active period, a predetermined power voltage may be generated with a first generation cycle. In the blank period, the predetermined power voltage may be generated with a second generation cycle longer than the first generation cycle.

In an embodiment, the voltage outputter may include a voltage generating block configured to receive an input power voltage and a cycle control signal, and output the predetermined power voltage based on the input power voltage and the cycle control signal and a voltage converting block configured to output the gate low voltage based on the predetermined power voltage.

In an embodiment, the input power voltage may include a first input power voltage and a second input power voltage. The voltage generating block may include a first switching element including a first terminal receiving the first input power voltage and a second terminal connected to a first node, a second switching element including a first terminal receiving a ground voltage and a second electrode connected to a second node, a third switching element including a first terminal receiving the ground voltage and a second terminal connected to the first node, a first capacitor including a first electrode connected to the first node and a second electrode connected to the second node, a fourth switching element including a first terminal connected to the second node and a second terminal connected to a third node, a fifth switching element including a first terminal receiving the second input power voltage and a second terminal connected to the third node, a sixth switching element including a first terminal receiving the ground voltage and a second terminal connected to a fourth node, a second capacitor including a first electrode connected to the third node and a second electrode connected to the fourth node, a seventh switching element including a first terminal connected to the fourth node and a second terminal connected to a fifth node, a third capacitor including a first electrode connected to the fifth node and a second electrode receiving the ground voltage. The fifth node may output the predetermined power voltage.

In an embodiment, a generation period in which the voltage generating block operates may include a first generation period and a second generation period. In the first generation period, the first capacitor may store the first input power voltage, and the second capacitor may store the second input power voltage. In the second generation period, the second node and the third node may be connected, and the fourth node and the fifth node may be connected. An absolute value of the predetermined power voltage may be a sum of the first input power voltage and the second input power voltage.

In an embodiment, the first input power voltage and the second input power voltage may be positive voltages, and the predetermined power voltage may be a negative voltage.

In an embodiment, the frame period may include first to fourth periods. In the first period, an active signal may have an activation level, and a generation cycle of the predetermined power voltage may have the second generation cycle. In the second period following the first period, the active signal may have the activation level, and a generation cycle may have the first generation cycle. In the third period following the second period, the active signal may have an inactivation level, and the generation cycle may have the first generation cycle. In the fourth period following the third period, the active signal may have the activation level, and the generation cycle may have the second generation cycle.

In an embodiment of the disclosure, an electronic device may include a display panel including a pixel, a gate driver configured to output a gate signal to the pixel, a data driver configured to apply a data voltage to the display panel, a voltage outputter configured to apply a gate high voltage and a gate low voltage to the gate driver, a driving controller configured to control the gate driver, the data driver and the voltage outputter based on an input control signal and a processor configured to output the input control signal to the driving controller. The gate signal may be generated based on the gate high voltage and the gate low voltage. The driving controller may control a driving frequency of the display panel. The gate low voltage may be generated based on a predetermined power voltage. A generation cycle of the predetermined power voltage may be controlled based on the driving frequency.

In an embodiment, the voltage outputter may include a voltage generating block configured to receive an input power voltage and a cycle control signal, and output the predetermined power voltage based on the input power voltage and the cycle control signal and a voltage converting block configured to output the gate low voltage based on the predetermined power voltage.

In an embodiment, the input power voltage may include a first input power voltage and a second input power voltage. The voltage generating block may include a first switching element including a first terminal receiving the first input power voltage and a second terminal connected to a first node, a second switching element including a first terminal receiving a ground voltage and a second electrode connected to a second node, a third switching element including a first terminal receiving the ground voltage and a second terminal connected to the first node, a first capacitor including a first electrode connected to the first node and a second electrode connected to the second node, a fourth switching element including a first terminal connected to the second node and a second terminal connected to a third node, a fifth switching element including a first terminal receiving the second input power voltage and a second terminal connected to the third node, a sixth switching element including a first terminal receiving the ground voltage and a second terminal connected to a fourth node, a second capacitor including a first electrode connected to the third node and a second electrode connected to the fourth node, a seventh switching element including a first terminal connected to the fourth node and a second terminal connected to a fifth node, a third capacitor including a first electrode connected to the fifth node and a second electrode receiving the ground voltage. The fifth node may output the predetermined power voltage.

In an embodiment, when the driving frequency is increased, the length of the generation period may be decreased.

In an embodiment, when the driving frequency is decreased, the length of the generation period may be increased.

In an embodiment, the driving frequency may include a first driving frequency and a second driving frequency higher than the first driving frequency. A frame period of the first driving frequency may include an active period in which the data voltage is applied and a blank period in which the applying of the data voltage is stopped. A frame period of the second driving frequency includes the active period. The generation cycle may have a first generation cycle in the active period, and the generation cycle may have a second generation cycle longer than the first generation cycle in the blank period.

As described above, in a blank period, a write gate signal may be maintained as a gate high voltage. A generation cycle in which a predetermined power voltage is generated may be changed. The generation cycle of the predetermined power voltage may be controlled based on a length of the blank period. A generation cycle in an active period may be shorter than the generation cycle in the blank period. When the generation cycle is decreased, a generating times of the predetermined power voltage may be decreased in the blank period. The generating times of the predetermined power voltage may be decreased, so that a power consumption for operating a voltage generating block may be reduced. Accordingly, a power consumption of a display device may be reduced.

Additionally, in the active period, the predetermined power voltage may be generated with a first generation cycle shorter than a second generation cycle, so that an output reliability of the predetermined power voltage in the active period may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE INVENTIVE CONCEPT

Figure 1:
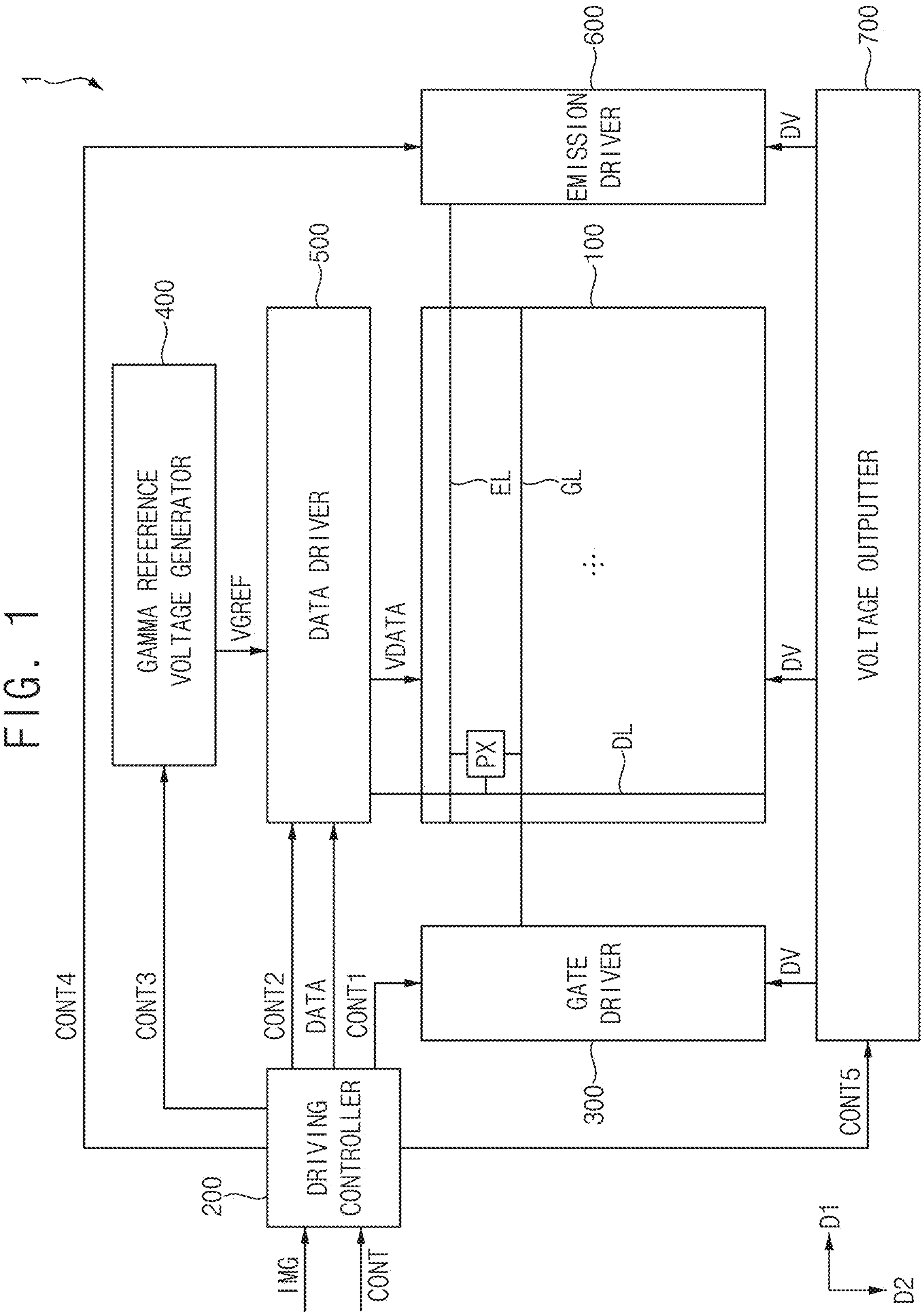
FIG. 1 is a block diagram illustrating an embodiment of a display device according to the inventive concept.

Hereinafter, the inventive concept will be explained in detail with reference to the accompanying drawings.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," may therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" may, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" may mean within one or more standard deviations, or within ±30%, 20%, 10%, 5% of the stated value, for example.

The terms such as "controller", "outputter" and "block" as used herein are intended to mean a hardware component such as a circuitry that performs a predetermined function. The hardware component may include a field-programmable gate array ("FPGA") or an application-specific integrated circuit ("ASIC"), for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device 1 according to the inventive concept.

Referring to FIG. 1, the display device 1 may include a display panel 100 and a display panel driver. The display panel driver may include a driving controller 200, a gate driver 300, a gamma reference voltage generator 400, a data driver 500, an emission driver 600 and a voltage outputter 700.

The display panel 100 may have a display region on which an image is displayed and a peripheral region next (adjacent) to the display region.

The display panel 100 may include a plurality of gate lines GL, a plurality of data lines DL, a plurality of emission lines EL and a plurality of pixel (or pixel circuits) PX electrically connected to the gate lines GL, the emission lines EL and the data lines DL. The gate lines GL may extend in a first direction D1. The data lines DL may extend in a second direction D2 crossing the first direction D1. The emission lines EL may extend in the first direction D1.

The driving controller 200 may receive input image data IMG and an input control signal CONT from an external device. In an embodiment, the input image data IMG may include red image data, green image data and blue image data, for example. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller may generate the fourth control signal CONT4 for controlling an operation of the emission driver 600 based on the input control signal CONT, and output the fourth control signal CONT4 to the emission driver 600.

The driving controller 200 may generate the fifth control signal CONT5 for controlling an operation of the voltage outputter 700 based on the input control signal CONT, and output the fifth control signal CONT5 to the voltage outputter 700. The fifth control signal CONT5 may include a cycle control signal CS of FIG. 4.

The gate driver 300 may generate gate signals driving the gate lines GL in response to the first control signal CONT1 received from the driving controller 200. The gate driver 300 may output the gate signals to the gate lines GL. The gate driver 300 may generate the gate signal based on a driving voltage DV. In an embodiment, the driving voltage DV may include a gate high voltage and a gate low voltage, for example. The gate signal may toggle between the gate high voltage and the gate low voltage. In an embodiment, the gate signals may include an initialization gate signal, a write gate signal and a bias gate signal, for example.

In an embodiment, the gate driver 300 may be disposed in the peripheral region. In an embodiment, the gate driver 300 may be integrated in the peripheral region.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages VDATA to the data lines DL.

In an embodiment, the data driver 500 may be disposed in the peripheral region. In an embodiment, the data driver 500 may be integrated in the peripheral region.

The emission driver 600 may generate emission signal (EM in FIG. 14) in response to the fourth control signal CONT4 received from the driving controller 200. The emission driver 600 may output the emission signal to the display panel 100. The emission driver 600 may generate the emission signal based on the driving voltage DV. In an embodiment, the driving voltage DV may include an emission high voltage having a relatively high voltage level and an emission low voltage having a relatively low voltage level, for example. The emission signal may toggle between the emission high voltage and the emission low voltage.

In an embodiment, the emission driver 600 may be disposed in the peripheral region. In an embodiment, the emission driver 600 may be integrated in the peripheral region.

Although the gate driver 300 is disposed on a first side of the display panel 100, and the emission driver 600 is disposed on a second side of the display panel 100 in FIG. 1 for convenience of explanation, the inventive concept is not limited thereto. The gate driver 300 and the emission driver 600 may be disposed on the first side of the display panel 100. In an embodiment, the gate driver 300 and the emission driver 600 may be disposed on the peripheral region of the display panel 100 on the same side of the display region of the display panel 100, for example. In an embodiment, the gate driver 300 and the emission driver 600 may be formed integrally with each other, for example.

The voltage outputter 700 may generate driving voltage DV in response to the fifth control signal CONT5 received from the driving controller 200. The voltage outputter 700 may output the driving voltages DV to the display panel 100, the gate driver 300 and the emission driver 600.

Figure 2:
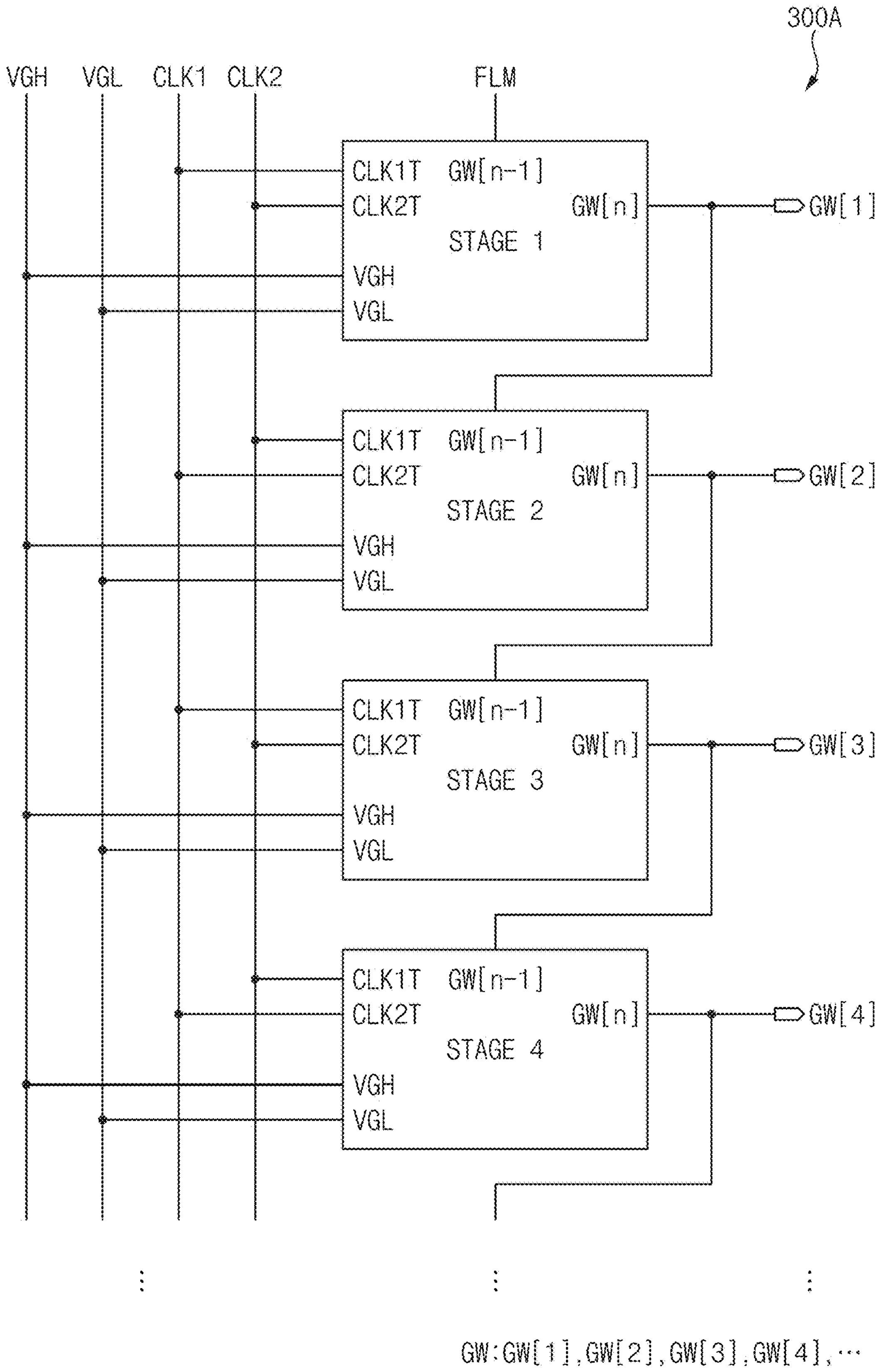
FIG. 2 is a block diagram illustrating an embodiment of an embodiment of a gate driver included in a display device of FIG. 1.

FIG. 2 is a block diagram illustrating an embodiment of a gate driver 300 included in a display device 1 of FIG. 1.

Referring to FIG. 1 and FIG. 2, the gate driver 300A may a plurality of stages STAGE 1, STAGE 2, STAGE 3, STAGE 4, . . . in which receives the vertical start signal FLM, a first clock signal CLK1 and a second clock signal CLK2, and sequentially outputs the write gate signals GW[1], GW[2], GW[3], GW[4], . . . to a plurality of pixels row by row. The plurality of stages STAGE 1, STAGE 2, STAGE 3, STAGE 4, . . . may output the write gate signals GW[1], GW[2], GW[3], GW[4], . . . .

The first clock signal CLK1 and the second clock signal CLK2 may apply to a first clock terminal CLK1T and a second clock terminal CLK2T of the first stage STAGE 1. The first clock signal CLK1 and the second clock signal CLK2 may apply to the second clock terminal CLK2T and the first clock terminal CLK1T of the second stage STAGE 2. Likewise, The first clock signal CLK1 and the second clock signal CLK2 may apply to the first clock terminal CLK1T and the second clock terminal CLK2T of the third stage STAGE 3. The first clock signal CLK1 and the second clock signal CLK2 may apply to the second clock terminal CLK2T and the first clock terminal CLK1T of the fourth stage STAGE 4.

The plurality of stages STAGE 1, STAGE 2, STAGE 3, STAGE 4, . . . may receive a gate high voltage VGH and a gate low voltage VGL. The plurality of stages STAGE 1, STAGE 2, STAGE 3, STAGE 4, . . . may may generate the write gate signals GW[1], GW[2], GW[3], GW[4], . . . based on the gate high voltage VGH, the gate low voltage, the first clock signal CLK1 and the second clock signal CLK2.

Figure 3:
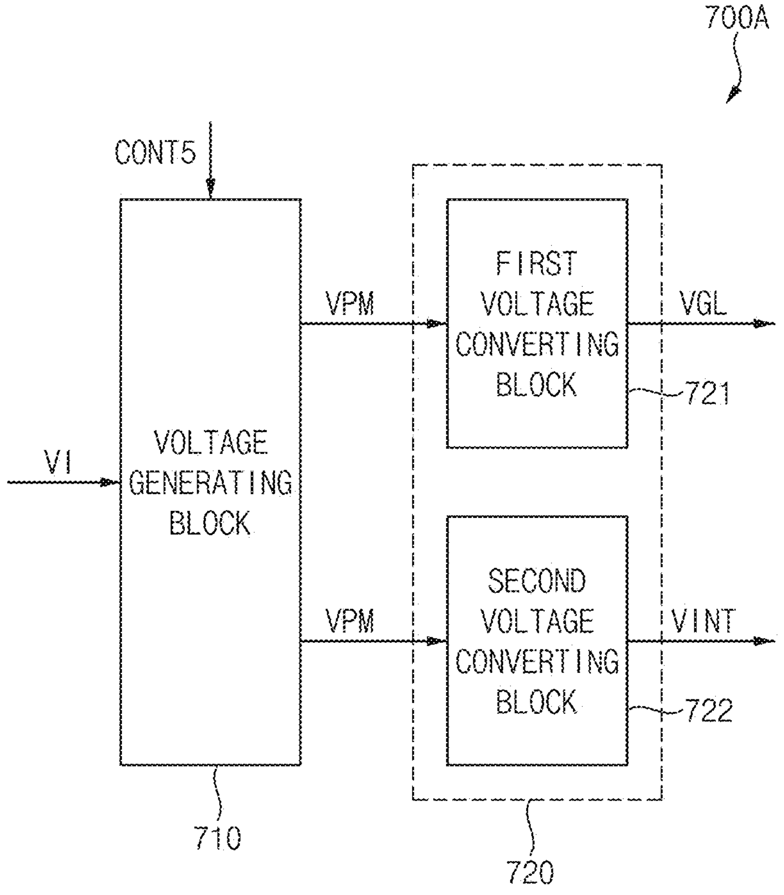
FIG. 3 is a block diagram illustrating an embodiment of an embodiment of a voltage outputter included in a display device of FIG. 1.

FIG. 3 is a block diagram illustrating an embodiment of a voltage outputter 700 included in a display device 1 of FIG. 1.

Referring to FIG. 1 and FIG. 3, a voltage outputter 700A may include a voltage generating block 710 and a voltage converting block 720. The voltage converting block 720 may include a first voltage converting block 721 and a second voltage converting block 722. However, the inventive concept is not limited to the number of the voltage converting block 720.

The voltage generating block 710 may receive an input power voltage VI and the fifth control signal CONT5. The input power voltage VI may include a first input power voltage and a second input power voltage. The first input power voltage may be different from the second input power voltage. The second input power voltage may be a positive voltage. The voltage generating block 710 may generate a low power voltage (also referred to as a predetermined power voltage) VPM based on the input power voltage VI and the fifth control signal CONT5. The low power voltage VPM may have a relatively low power voltage level (also referred to as a predetermined power voltage level), e.g., the low power voltage VPM may be a negative voltage. An absolute value of the low power voltage VPM may be a sum of the first input power voltage and a second input power voltage. The voltage generating block 710 may generate the low power voltage VPM multiple times during a frame period in which the pixel PX is driven.

The first voltage converting block 721 may receive the low power voltage VPM. The first voltage converting block 721 may generate the gate low voltage VGL based on the low power voltage VPM. The gate low voltage VGL may be different from the low power voltage VPM. The gate low voltage VGL may be a negative voltage.

The second voltage converting block 722 may receive the low power voltage VPM. The second voltage converting block 722 may generate an initialization voltage VINT based on the low power voltage VPM. The initialization voltage VINT may be different from the low power voltage VPM. The initialization voltage VINT may be different from the gate low voltage VGL. The initialization voltage VINT may be a negative voltage.

Figure 4:
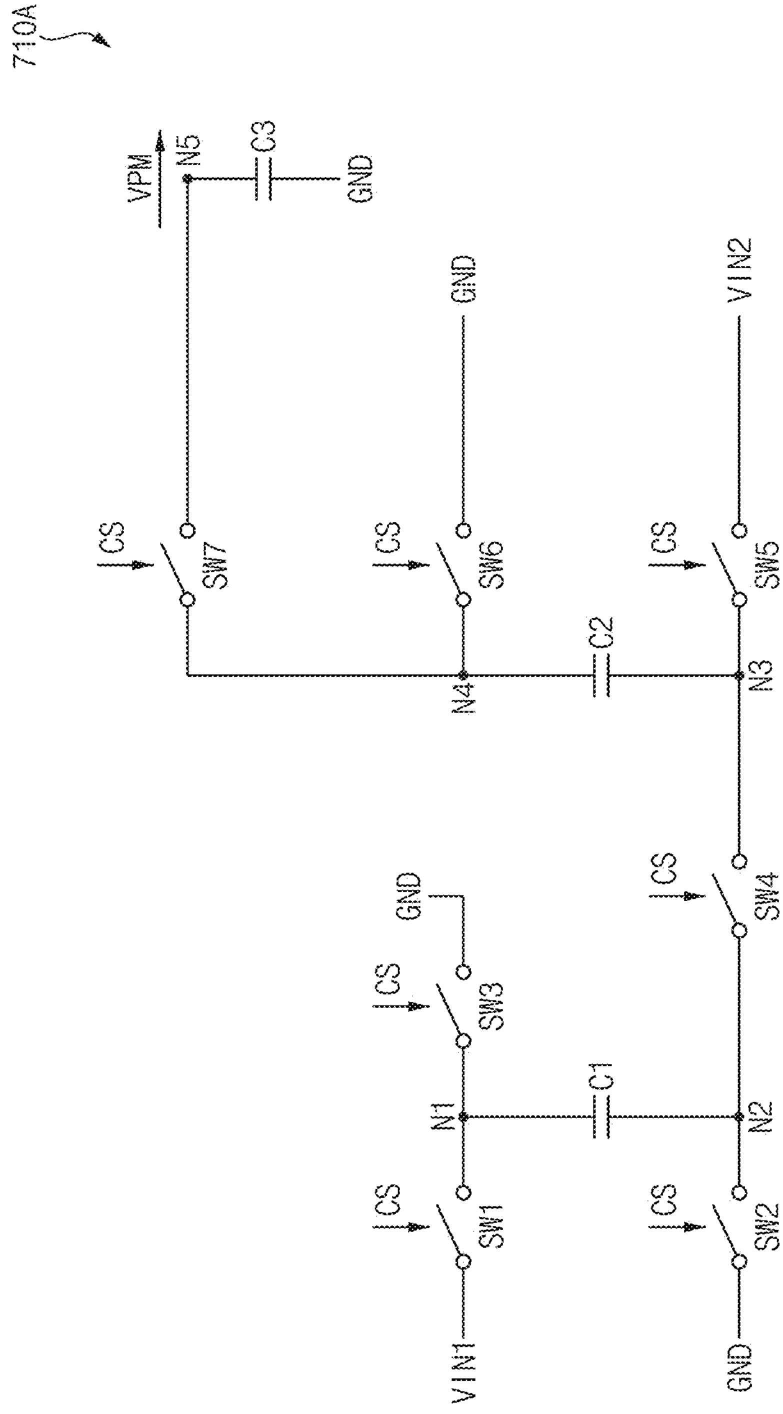
FIG. 4 is a circuit diagram illustrating an embodiment of an embodiment of a voltage generating block included in a voltage outputter of FIG. 3.

FIG. 4 is a circuit diagram illustrating an embodiment of a voltage generating block 710 included in a voltage outputter 700A of FIG. 3.

Referring to FIG. 1, FIG. 3 and FIG. 4, the voltage generating block 710A may include first to seventh switching element SW1, SW2, SW3, SW4, SW5, SW6 and SW7, and first to third capacitors C1, C2 and C3.

The first switching element SW1 may include a first terminal receiving the first input power voltage VIN1 and a second terminal connected to a first node N1. The first switching element SW1 may apply the first input power voltage VIN1 to the first node N1 in response to the cycle control signal CS.

The second switching element SW2 may include a first terminal receiving a ground voltage GND and a second terminal connected to a second node N2. The second switching element SW2 may apply the ground voltage GND to the second node N2 in response to the cycle control signal CS.

The third switching element SW3 may include a first terminal receiving a ground voltage GND and a second terminal connected to the first node N1. The third switching element SW3 may apply the ground voltage GND to the first node N1 in response to the cycle control signal CS.

The first capacitor C1 may include a first electrode connected to the first node N1 and a second electrode connected to the second node N2. The first capacitor C1 may store a difference between a voltage of the first node N1 and a voltage of the second node N2.

The fourth switching element SW4 may include a first terminal connected to the second node N2 and a second terminal connected to a third node N3. The fourth switching element SW4 may connect the second node N2 and the third node N3 in response to the cycle control signal CS.

The fifth switching element SW5 may include a first terminal receiving a second input power voltage VIN2 and a second terminal connected to the third node N3. The fifth switching element SW5 may apply the second input power voltage VIN2 to the third node N3 in response to the cycle control signal CS.

The sixth switching element SW6 may include a first terminal receiving the ground voltage GND and a second terminal connected to a fourth node N4. The sixth switching element SW6 may apply the ground voltage GND to the fourth node N4 in response to the cycle control signal CS.

The second capacitor C2 may include a first electrode connected to the third node N3 and a second electrode connected to the fourth node N4. The second capacitor C2 may store a voltage difference between a voltage of the third node N3 and a voltage of the fourth node N4.

The seventh switching element SW7 may include a first terminal connected to the fourth node N4 and a second terminal connected to a fifth node N5. The seventh switching element SW7 may connect the fourth node N4 and the fifth node N5 in response to the cycle control signal CS. The fifth node N5 may output the low power voltage VPM. In an embodiment, when the fourth node N4 and the fifth node N5 are connected, the low power voltage VPM may be outputted from the fifth node N5.

The third capacitor C3 may include a first electrode connected to the fifth node N5 and a second electrode receiving the ground voltage GND. The third capacitor C3 may maintain a voltage of the fifth node N5.

Figure 5:
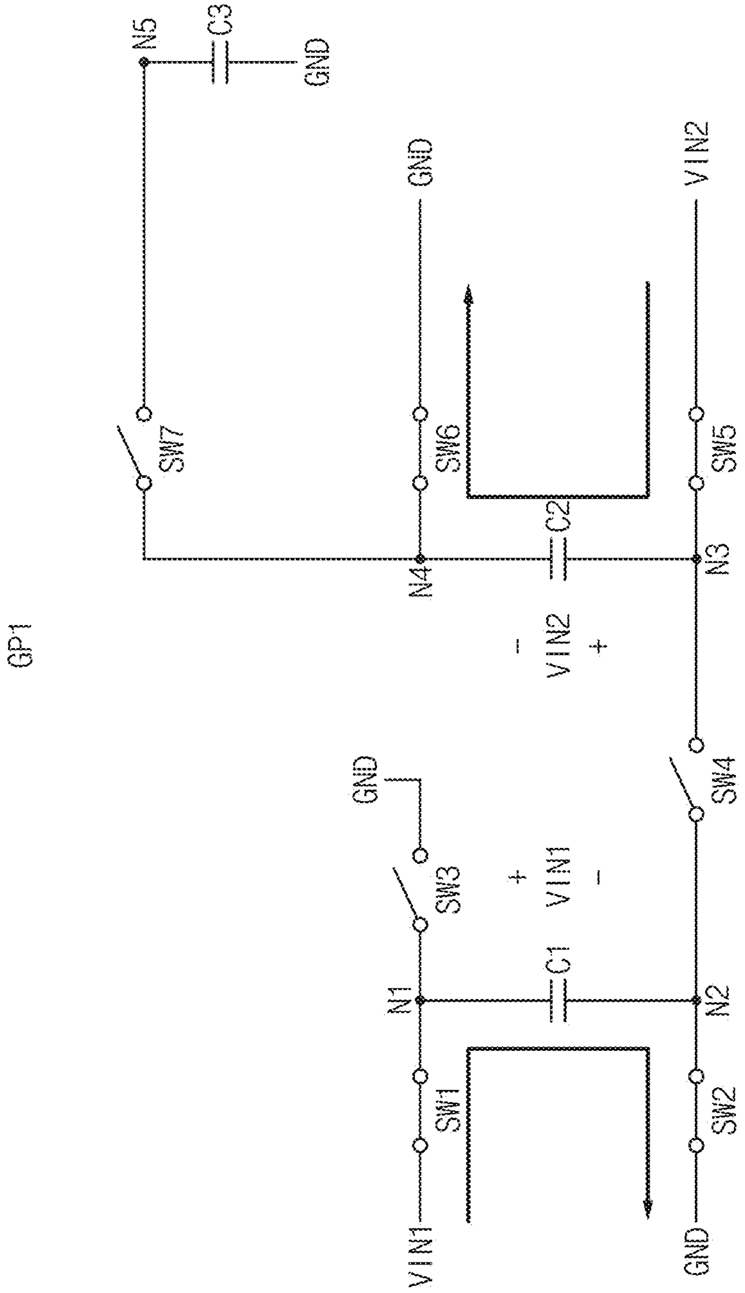
FIG. 5 is a circuit diagram illustrating an operation of a voltage generating block of FIG. 4 in a first generation period of a voltage generation period.
Figure 6:
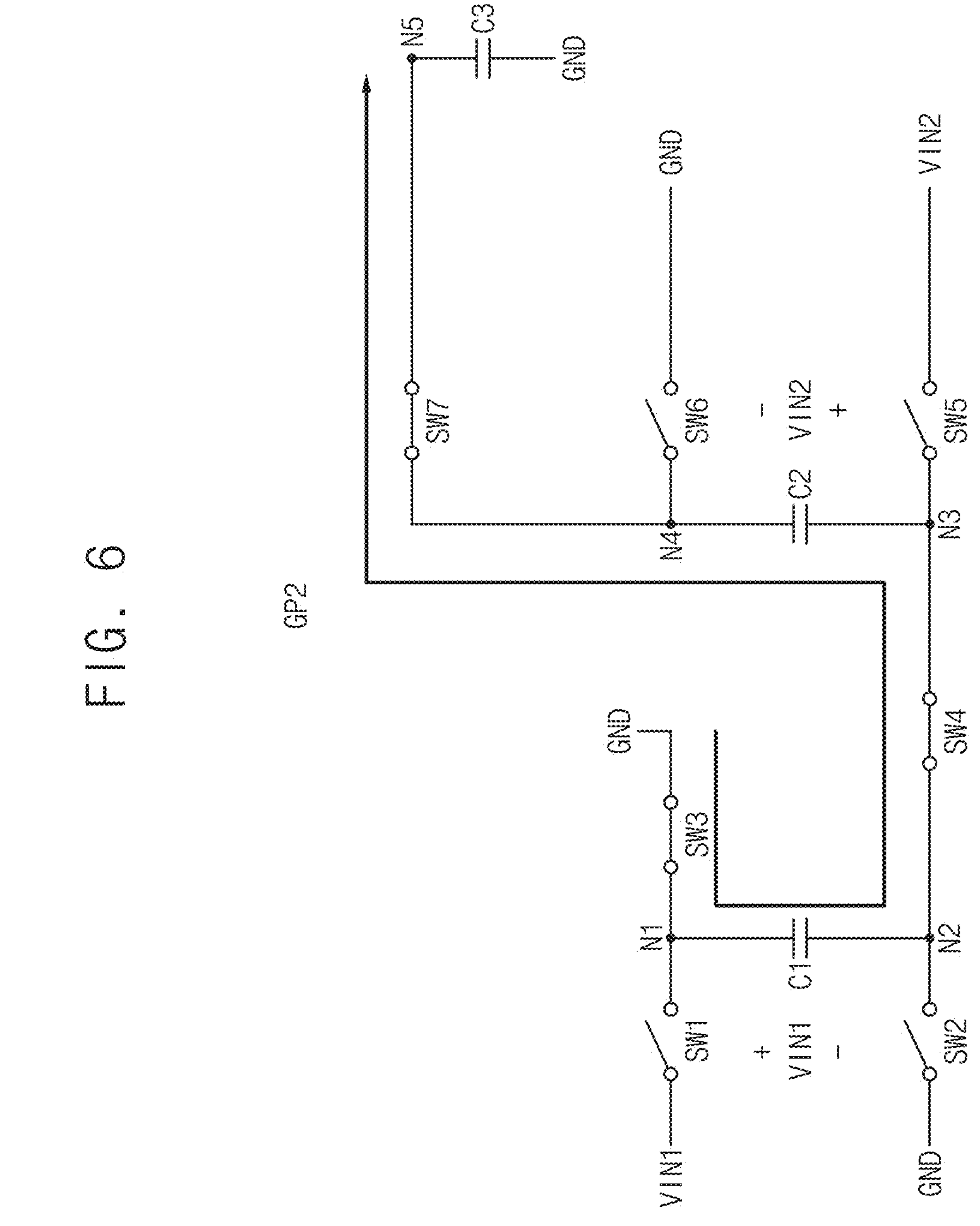
FIG. 6 is a circuit diagram illustrating an operation of a voltage generating block of FIG. 4 in a second generation period of a voltage generation period.

FIG. 5 is a circuit diagram illustrating an operation of a voltage generating block 710A of FIG. 4 in a first generation period of a voltage generation period. FIG. 6 is a circuit diagram illustrating an operation of a voltage generating block 710A of FIG. 4 in a second generation period of a voltage generation period.

Referring to FIG. 1 and FIG. 3 to FIG. 6, the voltage generating block 710A may generate the low power voltage VPM during a voltage generation period. The voltage generation period may include a first generation period GP1 and a second generation period GP2.

In the first generation period GP1, the first switching element SW1 may apply the first input power voltage VIN1 to the first node N1, and the second switching element SW2 may apply the ground voltage GND to the second node N2. Accordingly, the first generation period GP1, the first capacitor C1 may be charged to the first input power voltage VIN1. In the first generation period GP1, the fifth switching element SW5 may apply the second input power voltage VIN2 to the third node N3, and the sixth switching element SW6 may apply the ground voltage GND to the fourth node N4. Accordingly, in the first generation period GP1, the second capacitor C2 may be charged to the second input power voltage VIN2.

In the second generation period GP2, the third switching element SW3 may apply the ground voltage GND to the first node N1. In the second generation period GP2, the fourth switching element SW4 may connect the second node N2 and the third node N3. In the second generation period GP2, the seventh switching element SW7 may connect the fourth node N4 and the fifth node N5. Accordingly, a low power voltage VPM may be applied to the fifth node N5 through a path of the third switching element SW3, the first capacitor C1, the fourth switching element SW4, the second capacitor C2 and the seventh switching element SW7. An absolute value of the low power voltage VPM may be a sum of the first input power voltage VIN1 and the second input power voltage VIN2. The low power voltage VPM may be a negative voltage. A length of the voltage generation period may be a generation cycle. In an embodiment, the generation cycle may be a cycle that the low power voltage VPM is applied to the fifth node N5, for example. In an embodiment, the generation cycle of the low power voltage VPM may be controlled based on a driving frequency of the display panel 100.

Figure 7:
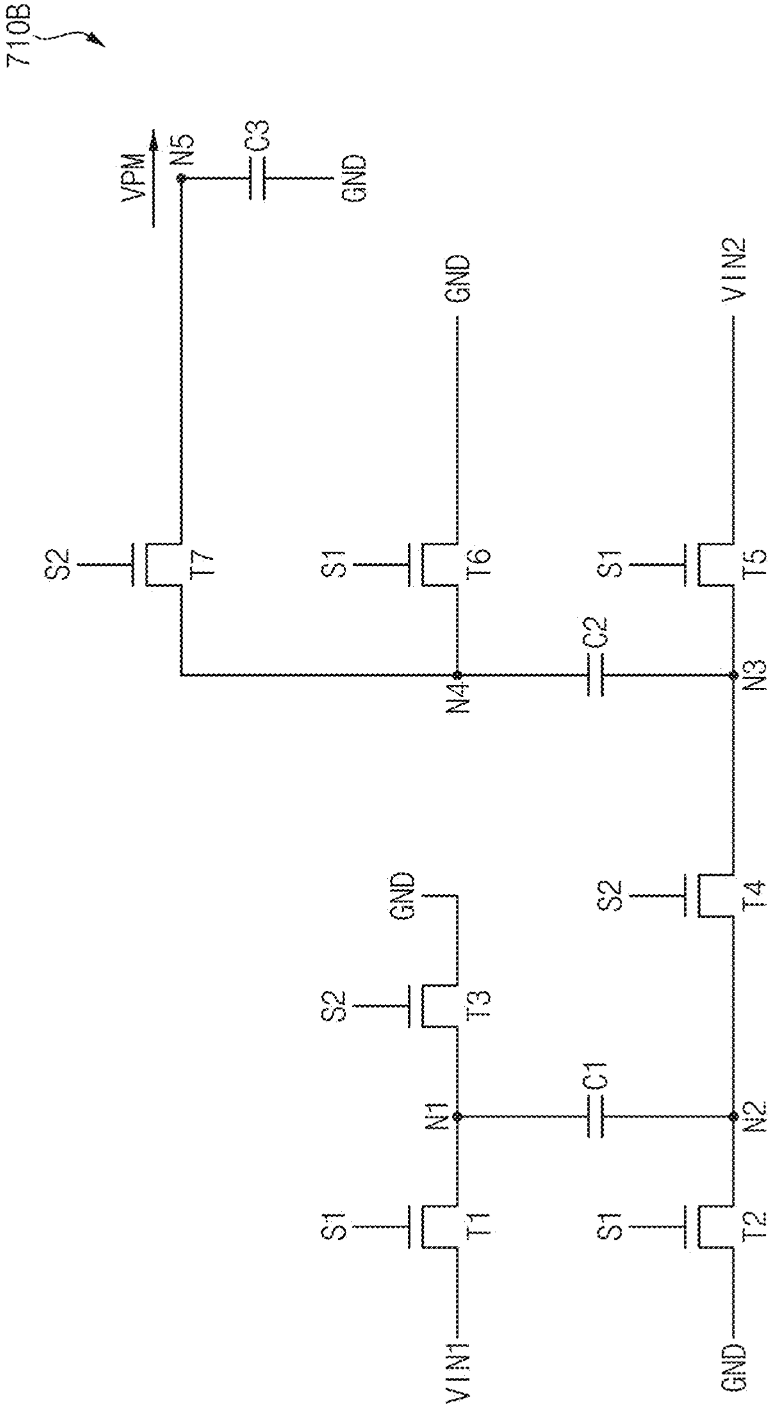
FIG. 7 is a circuit diagram illustrating an embodiment of a voltage generating block included in a voltage outputter of FIG. 3.

FIG. 7 is a circuit diagram illustrating an embodiment of a voltage generating block 710 included in a voltage outputter 700 of FIG. 3.

Referring to FIG. 7, a voltage generating block 710B may include first to seventh transistors T1, T2, T3, T4, T5, T6 and T7 and the first to third capacitors C1, C2 and C3. The voltage generating block 710B of FIG. 7 is substantially same as the voltage generating block 710A of FIG. 4 except that the switching element is a transistor, so that the same reference numerals will be used and any repetitive explanation concerning the above elements will be omitted.

Referring to FIG. 1, FIG. 3, FIG. 4 and FIG. 7, the cycle control signal CS may include a first cycle control signal S1 and a second cycle control signal S2. An activation level may be a level such that an element and/or driver, etc. turn on. An inactivation level may be a level such that an element and/or driver, etc. turn off. When the first cycle control signal S1 has an activation level, the second cycle control signal S2 may have an inactivation level. When the first cycle control signal S1 has an inactivation level, the second cycle control signal S2 may have an activation level.

The first transistor T1 may include a control electrode receiving the first cycle control signal S1, a first electrode receiving the first input power voltage VIN1 and a second electrode connected to the first node N1. The first transistor T1 may apply the first input power voltage VIN1 to the first node N1 in response to the first cycle control signal S1.

The second transistor T2 may include a control electrode receiving the first cycle control signal S1, a first electrode receiving the ground voltage GND and a second electrode connected to the second node N2. The second transistor T2 may apply the ground voltage GND to the second node N2 in response to the first cycle control signal S1.

The third transistor T3 may include a control electrode receiving the second cycle control signal S2, a first electrode receiving the ground voltage GND and a second electrode connected to the first node N1. The third transistor T3 may apply ground voltage GND to the first node N1 in response to the second cycle control signal S2.

The fourth transistor T4 may include a control electrode receiving the second cycle control signal S2, a first electrode connected to the second node N2 and a second electrode connected to the third node N3. The fourth transistor T4 may connect the second node N2 and the third node N3 in response to the second cycle control signal S2.

The fifth transistor T5 may include a control electrode receiving the first cycle control signal S1, a first electrode receiving the second input power voltage VIN2 and a second electrode connected to the third node N3. The fifth transistor T5 may apply the second input power voltage VIN2 to the third node N3 in response to the first cycle control signal S1.

The sixth transistor T6 may include a control electrode receiving the first cycle control signal S1, a first electrode receiving the ground voltage GND and a second electrode connected to the fourth node N4. The sixth transistor T6 may apply the ground voltage GND to the fourth node N4 in response to the first cycle control signal S1.

The seventh transistor T7 may include a control electrode receiving the second cycle control signal S2, a first electrode connected to the fourth node N4 and a second electrode connected to the fifth node N5. The seventh transistor T7 may connect the fourth node N4 and the fifth node N5 in response to the first cycle control signal S1. The fifth node N5 may output the low power voltage VPM.

Figure 8:
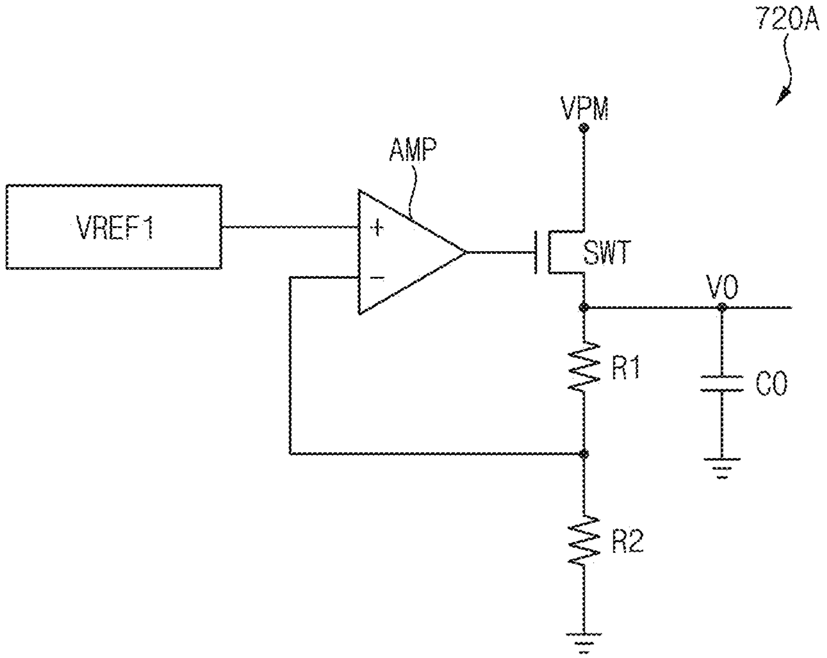
FIG. 8 is a circuit diagram illustrating an embodiment of a voltage converting block included in a voltage outputter of FIG. 3.

FIG. 8 is a circuit diagram illustrating an embodiment of a voltage converting block 720 included in a voltage outputter 700 of FIG. 3.

Referring to FIG. 1 to FIG. 8, the voltage converting block 720 may include a receiving amplifier AMP and a receiving transistor SWT connected to an output node of the receiving amplifier AMP. The receiving transistor SWT may include a control electrode connected to the output node of the receiving amplifier AMP, a first electrode receiving the low power voltage VPM and a second electrode outputting the power voltage.

The voltage converting block 720 may include a first resistor R1 including a first terminal connected to the second electrode of the receiving transistor SWT and a second terminal connected to a first input node of the receiving amplifier AMP, a second resistor R2 including a first terminal connected to the second terminal of the first resistor R1 and a second terminal connected to ground and a stabilization capacitor CO including a first electrode connected to the second electrode of the receiving transistor SWT and a second electrode connected to the ground. The second electrode of the receiving transistor SWT may output the output voltage VO. In an embodiment, the output voltage VO may be the gate low voltage VGL. In an embodiment, the output voltage VO may be the initialization voltage VINT.

Figure 9:
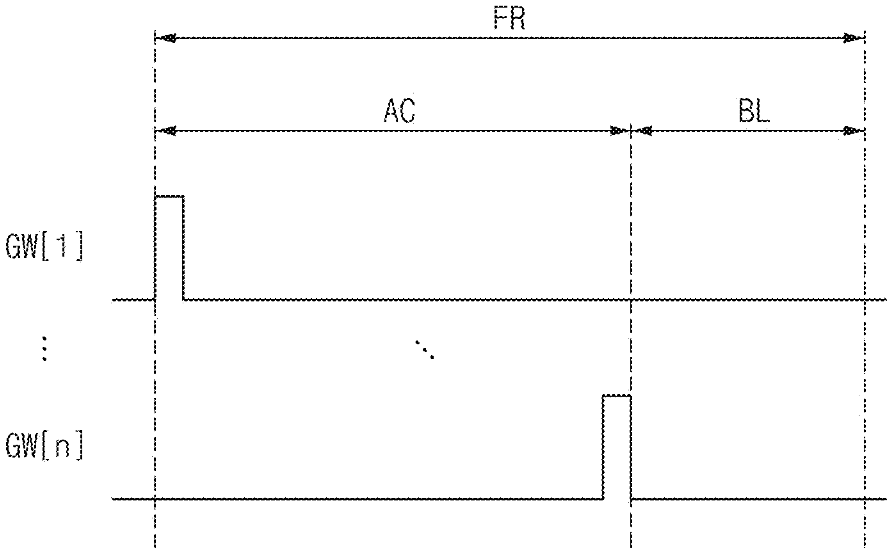
FIG. 9 is a timing diagram illustrating a frame period FR in which a pixel is driven included in a display device of FIG. 1.
Figure 10:
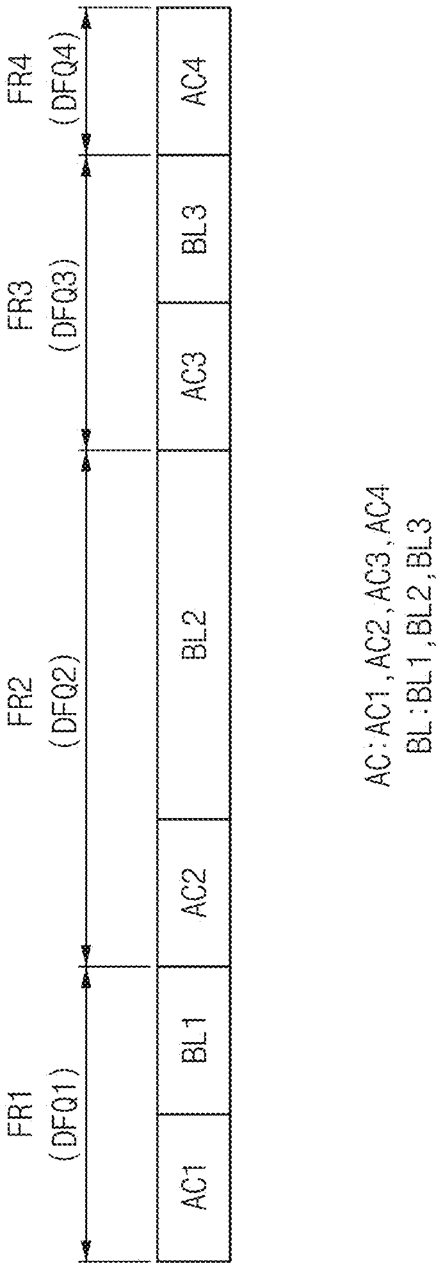
FIG. 10 is a conceptual diagram illustrating a driving frequency of a display panel included in a display device of FIG. 1.

FIG. 9 is a timing diagram illustrating a frame period FR in which a pixel PX is driven included in a display device 1 of FIG. 1. FIG. 10 is a conceptual diagram illustrating a driving frequency of a display panel 100 included in a display device 1 of FIG. 1.

Referring to FIG. 1 to FIG. 10, a frame period FR in which the pixel PX is driven may include an active period AC and a blank period BL. In the active period AC, the data voltage VDATA may be applied to the pixel PX. In the active period AC, the write gate signal GW may have an activation level. In the blank period BL, an applying of the data voltage VDATA to the pixel PX may be stopped. In an embodiment, in the blank period BL, the data voltage VDATA may not applied to the pixel PX, for example. In the blank period BL, the write gate signal GW may have an inactivation level. In an embodiment, in the blank period BL, the write gate signal GW may be maintained as the gate high voltage VGH, for example.

The display panel 100 may be driven as a variable frequency. The frame period FR in which the display panel 100 is driven may include the active period AC and the blank period BL.

The first frame FR1 may have a first driving frequency DFQ1. The first frame FR1 may include a first active period AC1 and a first blank period BL1. In an embodiment, the first driving frequency DFQ1 may be referred to as a reference driving frequency, for example.

The second frame FR2 may have a second driving frequency DFQ2. The second driving frequency DFQ2 may be different from the first driving frequency DFQ1. The second frame FR2 may include a second active period AC2 and a second blank period BL2. In an embodiment, the second driving frequency DFQ2 may be lower than the first driving frequency DFQ1, for example. When the second driving frequency DFQ2 is lower than the first driving frequency DFQ1, a length of the second blank period BL2 may be longer than a length of the first blank period BL1.

The third frame FR3 may have a third driving frequency DFQ3. The third driving frequency DFQ3 may be different from the first driving frequency DFQ1. The third frame FR3 may include a third active period AC3 and a third blank period BL3. In an embodiment, the third driving frequency DFQ3 may be higher than the first driving frequency DFQ1. When the third driving frequency DFQ3 is higher than the first driving frequency DFQ1, a length of the third blank period BL3 may be longer than a length of the first blank period BL1, for example.

The fourth frame FR4 may have a fourth driving frequency DFQ4. The fourth driving frequency DFQ4 may be different from the first driving frequency DFQ1. The fourth frame FR4 may include a fourth active period AC4. In an embodiment, the fourth frame FR4 may not include a blank period, for example. In an embodiment, the fourth driving frequency DFQ4 may be a maximum driving frequency in which the display panel 100 is driven, for example.

A length of the first active period AC1, a length of the second active period AC2, a length of the third active period AC3 and a length of the fourth active period AC4 may be substantially same.

When the display panel 100 is driven as the variable frequency, a length of the blank period BL may be changed. In an embodiment, when the driving frequency of the display panel 100 may be increased, the length of the blank period BL may be decreased, for example. In an embodiment, when the driving frequency of the display panel 100 may be decreased, the length of the blank period BL may be increased, for example.

In the illustrated embodiment, in the blank period BL, the write gate signal GW may be maintained as the gate high voltage VGH, for example. The generation cycle in which the low power voltage VPM is generated may be changed. The generation cycle of the low power voltage VPM may be controlled based on the length of the blank period BL. The generation cycle in the active period AC may be different from the generation cycle in the blank period BL. In an embodiment, the generation cycle in the active period AC may be shorter than the generation cycle in the blank period BL, for example. When the generation cycle is decreased, a generating times of the low power voltage VPM may be decreased in the blank period BL. The generating times of the low power voltage VPM may be decreased, so that a power consumption for operating the voltage generating block 710B may be reduced. Accordingly, a power consumption of the display device 1 may be reduced.

Additionally, in the active period AC, the low power voltage VPM may be generated with the first generation cycle shorter than the second generation cycle, so that an output reliability of the low power voltage VPM in the active period AC may be improved.

In an embodiment, the generation cycle at which the low power voltage VPM is generated may be changed based on the driving frequency of the display panel 100. In an embodiment, when the driving frequency of the display panel 100 becomes higher than the reference driving frequency, the generation cycle may become shorter, for example. When the driving frequency of the display panel 100 becomes lower than the reference driving frequency, the generation cycle may become longer. The generation cycle may be changed based on the driving frequency, so that the number of times the low power voltage VPM is generated may be reduced. The number of times the low power voltage VPM is generated may be reduced, so that a power consumption for operating the voltage generating block 710B may be reduced. Accordingly, a power consumption of the display device 1 may be reduced.

Figure 11:
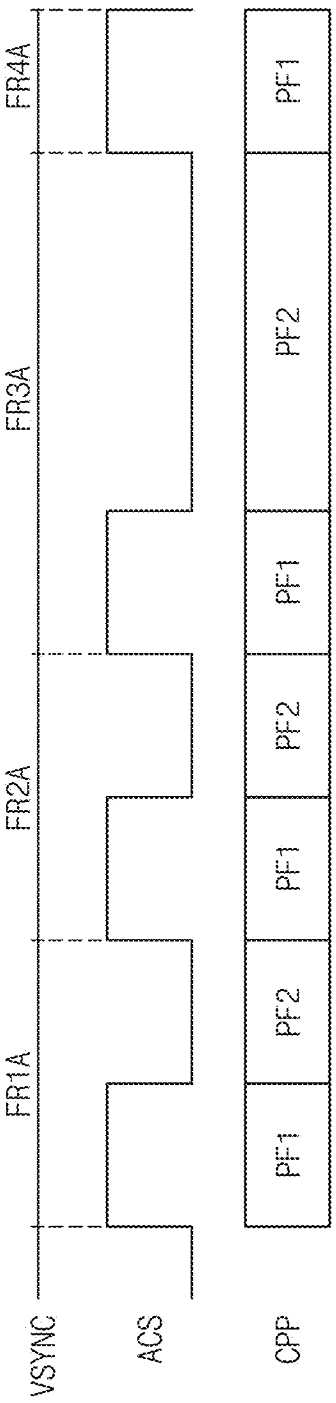
FIG. 11 is a timing diagram illustrating a generation cycle of a low power voltage generated from a voltage generating block included in a voltage outputter of FIG. 3.

FIG. 11 is a timing diagram illustrating a generation cycle CPP of a low power voltage generated from a voltage generating block included in a voltage outputter 700 of FIG. 3.

Referring to FIG. 1 to FIG. 11, when the vertical synchronization signal VSYNC has an activation level, the generation of the write gate signals GW[1], . . . , GW[n] may be started. When the active signal ACS has an activation level, the write gate signals GW[1], . . . , GW[n] may have an activation level. In an embodiment, when the active signal ACS has an activation level, the write gate signals GW[1], . . . , GW[n] may be sequentially outputted, for example. In the active period AC, the active signal ACS may have an activation level. In the blank period BL, the active signal ACS may have an inactivation level. When the active signal ACS has the inactivation level, the output of the write gate signals GW[1], . . . , GW[n] may be stopped.

In a first frame FR1A, during the activation period in which the active signal ACS has an activation level, the generation cycle CPP may be a first generation cycle PF1. In the first frame FR1A, during a first activation period, the voltage generating block 710 may generate the low power voltage VPM with the first generation cycle PF1. In the first frame FR1A, during the inactivation period in which the active signal ACS has an inactivation level, the generation cycle CPP may be a second generation cycle PF2. The second generation cycle PF2 may be longer than the first generation cycle PF1. In the first frame FR1A, during the first inactivation period, the voltage generating block 710 may generate the low power voltage VPM with the second generation cycle PF2.

In a second frame FR2A, during the activation period in which the active signal ACS has an activation level, the generation cycle CPP may be a first generation cycle PF1. In the second frame FR2A, during the second activation period, the voltage generating block 710 may generate the low power voltage VPM with the first generation cycle PF1. In the second frame FR2A, during the inactivation period in which the active signal ACS has an inactivation level, the generation cycle CPP may be a second generation cycle PF2. In the second frame FR2A, during the second inactivation period, the voltage generating block 710 may generate the low power voltage VPM with the second generation cycle PF2A.

In a third frame FR3A, during the activation period in which the active signal ACS has an activation level, the generation cycle CPP may be the first generation cycle PF1. In the third frame FR3A, during the third activation period, the voltage generating block 710 may generate the low power voltage VPM with the first generation cycle PF1. In the third frame FR3A, during the inactivation period in which the active signal ACS has an inactivation level, the generation cycle CPP may be a second generation cycle PF2. In the third frame FR3A, during the third inactivation period, the voltage generating block 710 may generate the low power voltage VPM with the second generation cycle PF2A.

In a fourth frame FR4A, during the activation period in which the active signal ACS has an activation level, the generation cycle CPP may be the first generation cycle PF1. In the fourth frame FR4A, during the fourth activation period, the voltage generating block 710 may generate the low power voltage VPM with the first generation cycle PF1. In the fourth frame FR4A, during the inactivation period in which the active signal ACS has an inactivation level, the generation cycle CPP may be a second generation cycle PF2. In the fourth frame FR4A, during the fourth inactivation period, the voltage generating block 710 may generate the low power voltage VPM with the second generation cycle PF2A.

When the display panel 100 is driven with the variable frequency, a length of the first inactivation period and a length of the second inactivation period may be different. In an embodiment, when the driving frequency of the first frame FR1A is higher than the driving frequency of the second frame FR2A, the length of the second inactivation period may be longer than the length of the first inactivation period, for example. Accordingly, in the second frame FR2A, the period in which the low power voltage VPM is generated with the second generation cycle PF2 may be longer. Accordingly, when the display panel 100 is driven with a variable frequency, the power consumption of the display device 1 may be further reduced.

Additionally, in the first to fourth activation periods, the low power voltage VPM may be generated with the first generation cycle PF1 shorter than the second generation cycle PF2, so that an output reliability of the low power voltage VPM may be improved in the first to fourth activation periods.

Figure 12:
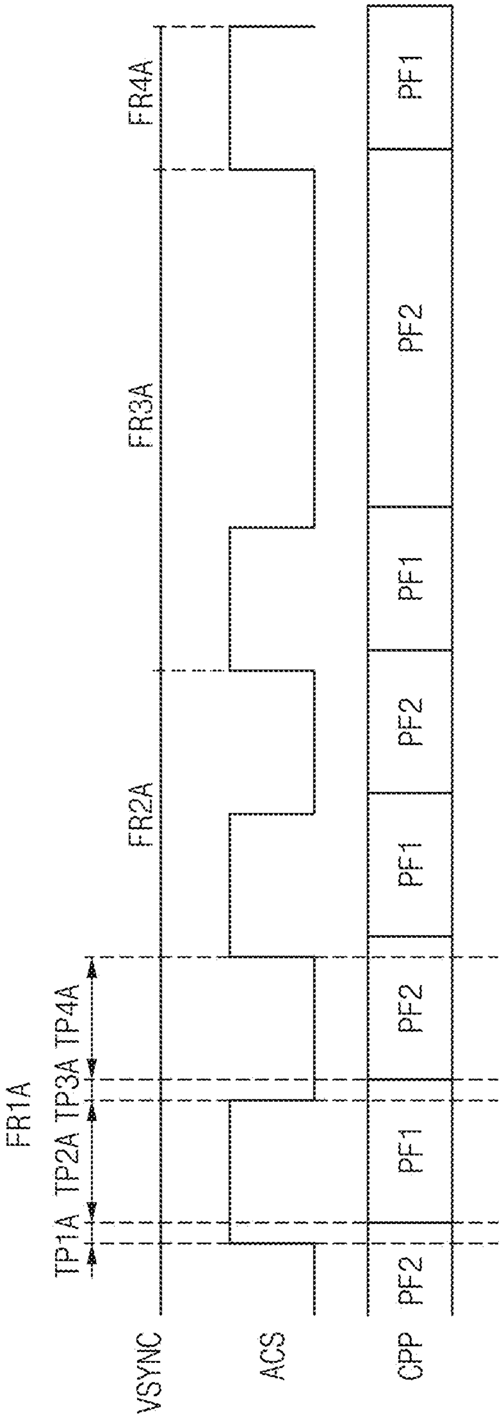
FIG. 12 is a timing diagram illustrating a generation cycle of a low power voltage generated from a voltage generating block included in a voltage outputter of FIG. 3.

FIG. 12 is a timing diagram illustrating a generation cycle CPP of a low power voltage generated from a voltage generating block included in a voltage outputter 700 of FIG. 3.

Referring to FIG. 1 to FIG. 9 and FIG. 12, when the vertical synchronization signal VSYNC has an activation level, the generation of the write gate signals GW[1], . . . , GW[n] may be started. When the active signal ACS has an activation level, the write gate signals GW[1], . . . , GW[n] may have an activation level. In an embodiment, when the active signal ACS has an activation level, the write gate signals GW[1], . . . , GW[n] may be sequentially outputted, for example. In the active period AC, the active signal ACS may have an activation level. In the blank period BL, the active signal ACS may have an inactivation level. When the active signal ACS has the inactivation level, the output of the write gate signals GW[1], . . . , GW[n] may be stopped.

In a first frame FR1A, during the activation period in which the active signal ACS has an activation level, the generation cycle CPP may be a first generation cycle PF1. In the first frame FR1A, during a first activation period, the voltage generating block 710 may generate the low power voltage VPM with the first generation cycle PF1. In the first frame FR1A, during the inactivation period in which the active signal ACS has an inactivation level, the generation cycle CPP may be a second generation cycle PF2. The second generation cycle PF2 may be longer than the first generation cycle PF1. In the first frame FR1A, during the first inactivation period, the voltage generating block 710 may generate the low power voltage VPM with the second generation cycle PF2.

The first frame FR1A may include first to fourth sub-frame periods TP1A, TP2A, TP3A and TP4A. In the first sub-frame period TP1A, the active signal ACS may have an activation level, the generation cycle CPP may be the second generation cycle PF2. In the second sub-frame period TP2A, the active signal ACS may have an activation level, the generation cycle CPP may be the first generation cycle PF1 shorter than the second generation cycle PF2. In the third sub-frame period TP3A, the active signal ACS may have an inactivation level, the generation cycle CPP may be the first generation cycle PF1. In the fourth sub-frame period TP4A, the active signal ACS may have an inactivation level, the generation cycle CPP may be the second generation cycle PF2. In an embodiment, the generation cycle CPP may be changed with a delay, for example. The generation cycle CPP may be changed with a delay, so that an output stability of the low power voltage VPM may be improved. In an embodiment, a length of the third sub-frame period TP3A may be longer than a length of the first sub-frame period TP1A.

When the display panel 100 is driven with the variable frequency, the length of the first inactivation period and the length of the second inactivation period may be different. In an embodiment, when the driving frequency of the first frame FR1A is higher than the driving frequency of the second frame FR2A, the length of the second inactivation period may be longer than the length of the first inactivation period, for example. Accordingly, in the second frame FR2A, the period in which the low power voltage VPM is generated with the second generation cycle PF2 may be longer. Accordingly, when the display panel 100 is driven with the variable frequency, the power consumption of the display device 1 may be further reduced.

Additionally, in the first to fourth activation periods, the low power voltage VPM may be generated with a first generation cycle PF1 shorter than the second generation cycle PF2, so that an output reliability of the low power voltage VPM may be improved in the first to fourth activation periods.

Figure 13:
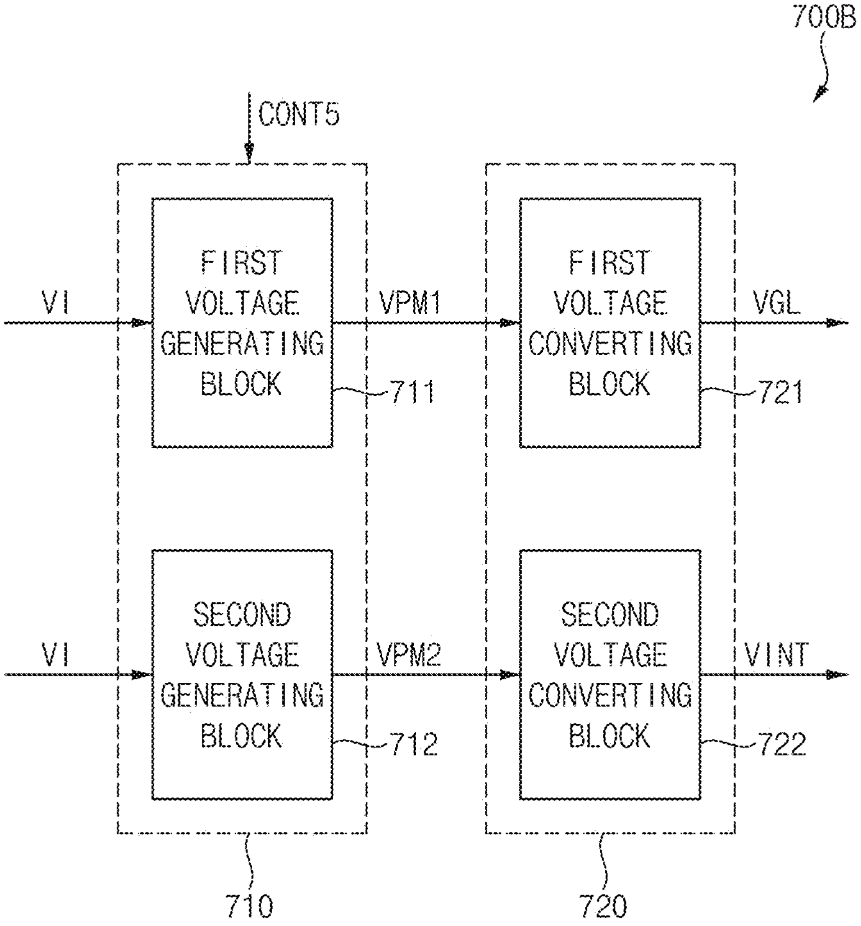
FIG. 13 is a block diagram illustrating an embodiment of a voltage outputter included in a display device of FIG. 1.

FIG. 13 is a block diagram illustrating an embodiment of a voltage outputter 700 included in a display device 1 of FIG. 1.

A voltage outputter 700B of FIG. 13 may include a first voltage generating block 711, a second voltage generating block 712, a first voltage converting block 721 and a second voltage converting block 722.

The voltage outputter 700B of FIG. 13 is substantially same as the voltage outputter 700A except that the voltage generating block 710 includes the first voltage generating block 711 and the second voltage generating block 712, the first voltage generating block 711 outputs a first low power voltage VPM1 to the first voltage converting block 721, and the second voltage generating block 712 outputs a second low power voltage VPM2 to the second voltage converting block 722, so that the same reference numerals will be used and any repetitive explanation concerning the above elements will be omitted.

Referring to FIG. 1 to FIG. 13, in the illustrated embodiment, the write gate signal GW may be maintained as the gate high voltage VGH in the blank period BL. The generation cycle in which the low power voltage VPM is generated may be changed. The generation cycle of the low power voltage VPM may be controlled based on the length of the blank period BL. The generation cycle in the active period AC may be different from the generation cycle in the blank period BL. In an embodiment, the generation cycle in the active period AC may be shorter than the generation cycle in the blank period BL, for example. When the generation cycle is decreased, the number of times the low power voltage VPM is generated in the blank period BL may be reduced. The number of times the low power voltage VPM is generated may be reduced, so that the power consumption for operating the first voltage generating block 711 may be reduced. Accordingly, a power consumption of the display device 1 may be reduced.

Figure 14:
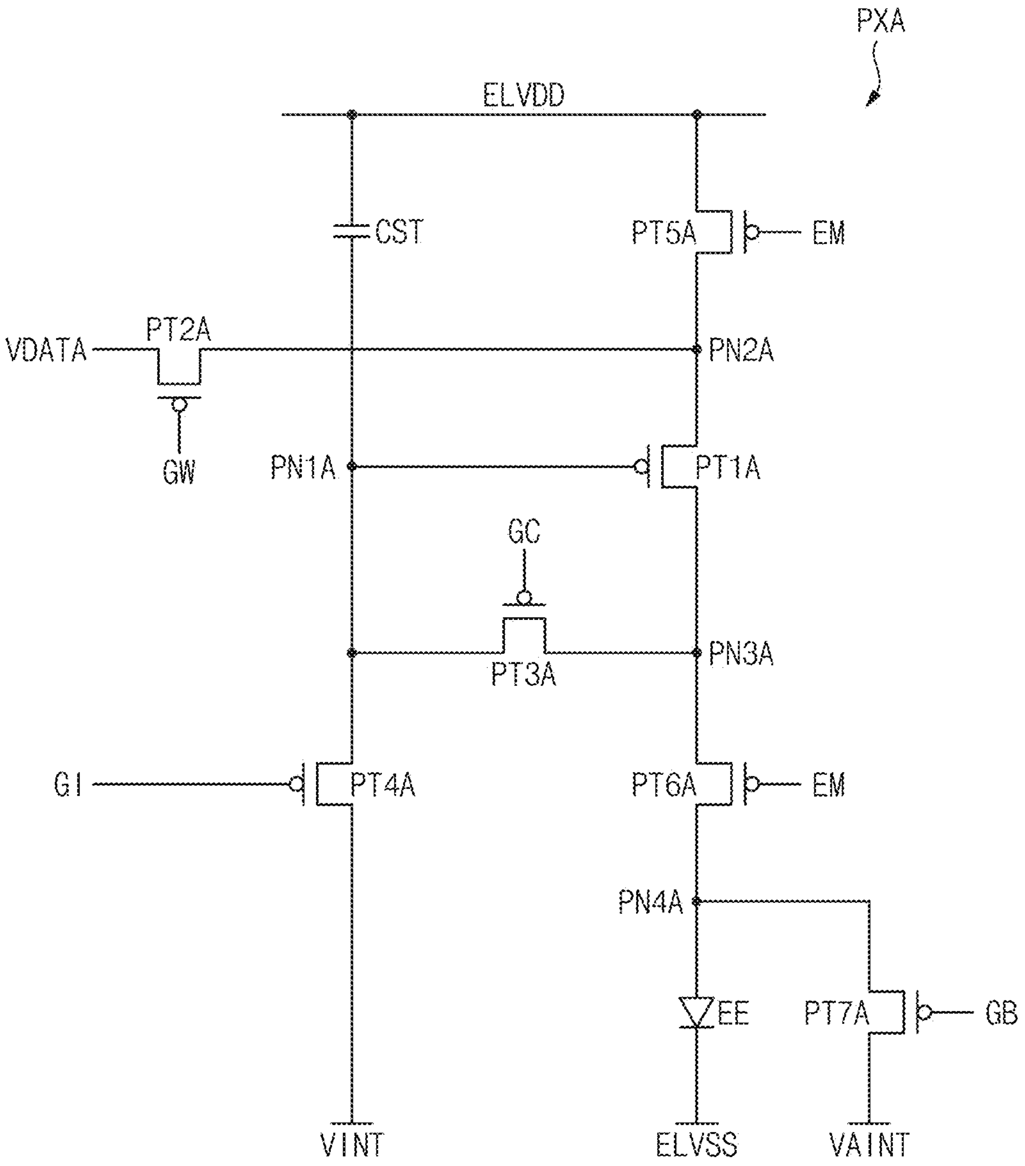
FIG. 14 is a circuit diagram illustrating an embodiment of pixel included in a display device of FIG. 1.

FIG. 14 is a circuit diagram illustrating an embodiment of pixel PX included in a display device 1 of FIG. 1.

Referring to FIG. 1 and FIG. 14, a pixel PXA may include a first pixel transistor PT1A, a second pixel transistor PT2A, a third pixel transistor PT3A, a fourth pixel transistor PT4A, a fifth pixel transistor PT5A, a sixth pixel transistor PT6A, a seventh pixel transistor PT7A, a storage capacitor CST and the light-emitting element EE.

The first pixel transistor PT1A may include a control electrode connected to a first pixel node PN1A, a first electrode connected to a second pixel node PN2A and a second electrode connected to a third pixel node PN3A. The first pixel transistor PT1A may generate a driving current based on a voltage of the first pixel node PN1A. In an embodiment, the first pixel transistor PT1A may be referred to as a driving transistor, for example.

The second pixel transistor PT2A may include a control electrode receiving a write gate signal GW, a first electrode receiving the data voltage VDATA and a second electrode connected to the second pixel node PN2A. The second pixel transistor PT2A may apply the data voltage VDATA to the second pixel node PN2A in response to the write gate signal GW. In an embodiment, the second pixel transistor PT2A may be referred to as a write transistor, for example.

The third pixel transistor PT3A may include a control electrode receiving the write gate signal GW, a first electrode connected to the third pixel node PN3A and a second electrode connected to the first pixel node PN1A. The third pixel transistor PT3 A may connect the first pixel node PN1A and the third pixel node PN3A in response to the write gate signal GW. In an embodiment, the third pixel transistor PT3A may diode-connect the first pixel transistor PT1A in response to the write gate signal GW, for example. In an embodiment, the third pixel transistor PT3A may be referred to as a compensation transistor, for example.

The fourth pixel transistor PT4A may include a control electrode receiving the initialization gate signal GI, a first electrode receiving the initialization voltage VINT and a second electrode connected to the first pixel node PN1A. The fourth pixel transistor PT4A may apply the initialization voltage VINT to the first pixel node PN1A in response to the initialization gate signal GI. In an embodiment, the fourth pixel transistor PT4A may be referred to as an initialization transistor, for example.

The fifth pixel transistor PT5A may include a control electrode receiving the emission signal EM (refer to FIG. 14), a first electrode receiving the first power voltage ELVDD and a second electrode connected to the second pixel node PN2A. The fifth pixel transistor PT5A may apply the first power voltage ELVDD to the second pixel node PN2 A in response to the emission signal EM. In an embodiment, the fifth pixel transistor PT5A may be referred to as a second emission transistor, for example.

The sixth pixel transistor PT6A may include a control electrode receiving the emission signal EM, a first electrode connected to the third pixel node PN3A and a second electrode connected to a fourth pixel node PN4A. The sixth pixel transistor PT6A may connect the third pixel node PN3A and the fourth pixel node PN4A in response to the emission signal EM. In an embodiment, the sixth pixel transistor PT6A may be referred to as a first emission transistor, for example.

The seventh pixel transistor PT7A may include a control electrode receiving the bias gate signal GB, a first electrode receiving the light-emitting element initialization voltage VAINT and a second electrode connected to the fourth pixel node PN4A. The seventh pixel transistor PT7A may apply the light-emitting element initialization voltage VAINT to the fourth pixel node PN4A in response to the bias gate signal GB.

The storage capacitor CST may include a first electrode receiving the first power supply voltage ELVDD and a second electrode connected to the first pixel node PN1A. The storage capacitor CST may store a voltage of the first pixel node PN1A.

The light-emitting element EE may include a first electrode connected to the fourth pixel node PN4A and a second electrode receiving the second power voltage ELVSS. The light-emitting element EE may emit light based on the driving current. In an embodiment, the light-emitting element EE may be, but is not limited to, an organic light-emitting diode ("OLED"). In other embodiments, the light-emitting element EE may be a nano light-emitting diode ("NED"), a quantum dot ("QD") light-emitting diode, a micro light-emitting diode, an inorganic light-emitting diode, or any other suitable light-emitting element.

Figure 15:
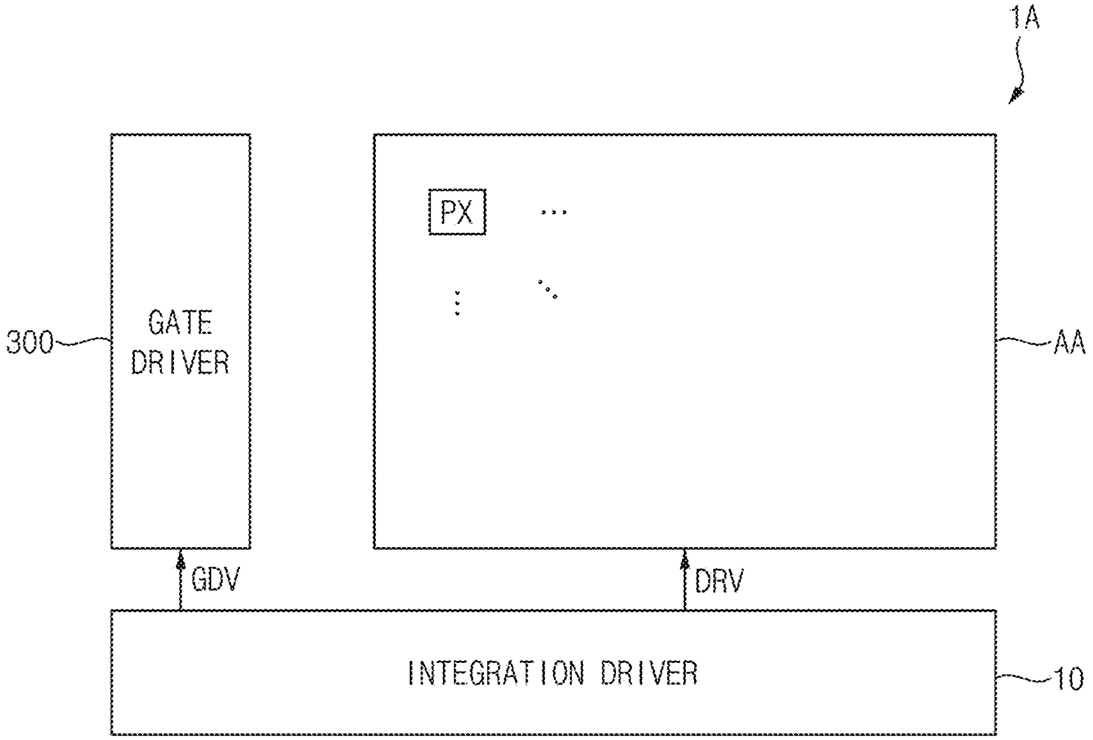
FIG. 15 is a block diagram illustrating an embodiment of a display device according to the inventive concept.

FIG. 15 is a block diagram illustrating an embodiment of a display device 1A according to the inventive concept.

A display device 1A of FIG. 15 is substantially same as the display device 1 of FIG. 1 except that the driving controller 200, the gamma reference voltage generator 400, the data driver 500, the emission driver 600 and the voltage outputter 700 are formed as an integration driver 10, so that the same reference numerals will be used and any repetitive explanation concerning the above elements will be omitted.

Referring to FIG. 1 to FIG. 15, in an embodiment, the integration driver 10 may include a driving controller 200, a gamma reference voltage generator 400, a data driver 500, and a voltage outputter 700. The integrated driver 10 may apply a gate driving voltage GDV to the gate driver 300. The gate driving voltage GDV may include the gate high voltage VGH and the gate low voltage VGL. The integration driver 10 may apply a panel driving voltage DRV to a display region AA of the display panel 100. The panel driving voltage DRV may include the data voltage VDATA, a first power voltage ELVDD and a second power voltage ELVSS.

In the illustrated embodiment, in the blank period BL, the write gate signal GW may be maintained as the gate high voltage VGH. The generation cycle in which the low power voltage VPM is generated may be changed. The generation cycle of the low power voltage VPM may be controlled based on the length of the blank period BL. The generation cycle in the active period AC may be different from the generation cycle in the blank period BL. In an embodiment, the generation cycle in the active period AC may be shorter than the generation cycle in the blank period BL, for example. When the generation cycle is decreased, a generating times of the low power voltage VPM may be decreased in the blank period BL. The generating times of the low power voltage VPM may be decreased, so that a power consumption for operating the voltage generating block 710 may be reduced. Accordingly, a power consumption of the display device 1 may be reduced.

Additionally, in the active period AC, the low power voltage VPM may be generated with the first generation cycle shorter than the second generation cycle, so that an output reliability of the low power voltage VPM in the active period AC may be improved.

In an embodiment, the generation cycle at which the low power voltage VPM is generated may be changed based on the driving frequency of the display panel 100. In an embodiment, when the driving frequency of the display panel 100 becomes higher than the reference driving frequency, the generation cycle may become shorter, for example. When the driving frequency of the display panel 100 becomes lower than the reference driving frequency, the generation cycle may become longer. The generation cycle may be changed based on the driving frequency, so that the number of times the low power voltage VPM is generated may be reduced. The number of times the low power voltage VPM is generated may be reduced, so that a power consumption for operating the voltage generating block 710 may be reduced. Accordingly, a power consumption of the display device 1 may be reduced.

Figure 16:
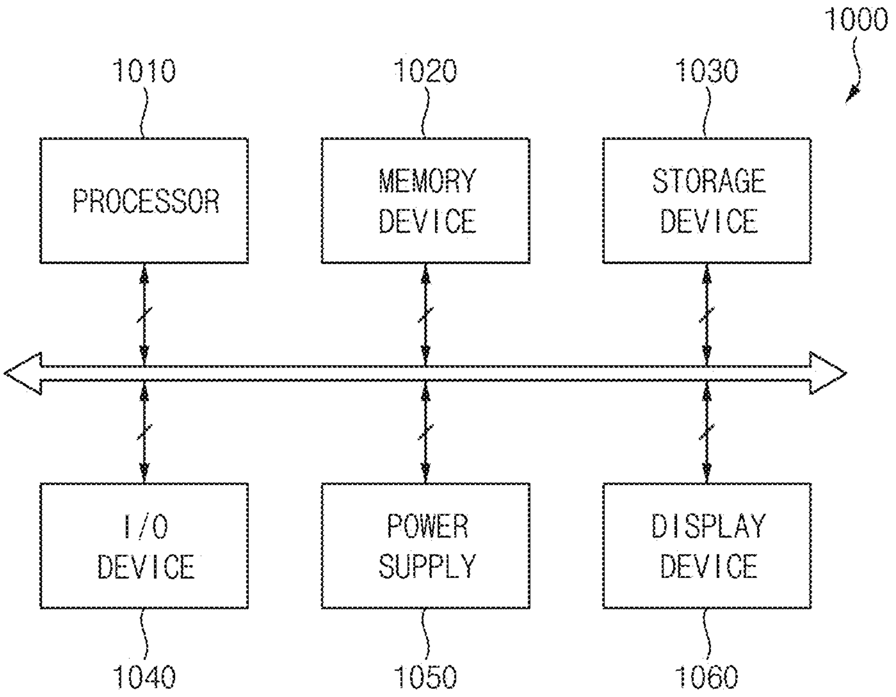
FIG. 16 is a block diagram illustrating an embodiment of an electronic device according to the inventive concept.
Figure 17:
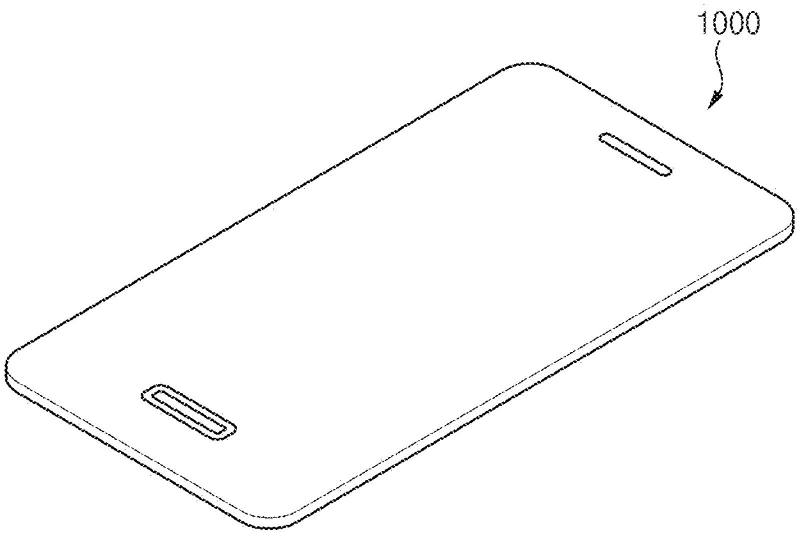
FIG. 17 is a diagram illustrating an embodiment in which the electronic device of FIG. 16 is implemented as a smart phone.

FIG. 16 is a block diagram illustrating an embodiment of an electronic device 1000 according to the inventive concept. FIG. 17 is a diagram illustrating an embodiment in which the electronic device of FIG. 16 is implemented as a smart phone.

Referring to FIG. 16, the electronic device 1000 may include a processor 1010, a memory device 1020, a storage device 1030, an input/output ("I/O") device 1040, a power supply 1050, and a display device 1060. Here, the display device 1060 may be the display device 1 of FIG. 1. Here, the display device 1060 may be the display device 1A of FIG. 15. Additionally, the electronic device 1000 may further include a plurality of ports for communicating with a video card, a sound card, a memory card, a universal serial bus ("USB") device, other electronic device, etc.

In an embodiment, as illustrated in FIG. 16, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head mounted display ("HMD") device, or the like, for example.

The processor 1010 may perform various computing functions or various tasks. The processor 1010 may be a micro-processor, a central processing unit ("CPU"), an application processor ("AP"), or the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1. The processor 1010 may output the input image data IMG and the input control signal CONT to the integration driver 10 of FIG. 15.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like and/or at least one volatile memory device such as a dynamic random access memory ("DRAM") device, a static random access memory ("SRAM") device, a mobile DRAM device, or the like, for example.

The storage device 1030 may include a solid state drive ("SSD") device, a hard disk drive ("HDD") device, a compact disc read-only memory ("CD-ROM") device, or the like. The I/O device 1040 may include an input device such as a keyboard, a keypad, a mouse device, a touch-pad, a touch-screen, or the like and an output device such as a printer, a speaker, or the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 17, the electronic device of the inventive concept is shown implemented as a smartphone, but the inventive concept is not limited thereto. The electronic device may be a television, a monitor, a laptop computer, or a tablet. Additionally, the electronic device may be a car.

The display device in the embodiments may be applied to a display device included in a computer, a notebook, a mobile phone, a smart phone, a smart pad, a portable media player ("PMP"), a personal digital assistance ("PDA"), a motion pictures expert group audio layer III ("MP3") player, or the like.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including a pixel;

a gate driver configured to output a gate signal to the pixel;

a data driver configured to apply a data voltage to the display panel;

a voltage outputter configured to apply a gate high voltage having a first voltage level and a gate low voltage having a second voltage level lower than the first voltage level to the gate driver; and a driving controller configured to control the gate driver, the data driver and the voltage outputter, wherein the gate signal is generated based on the gate high voltage and the gate low voltage, wherein the driving controller controls a driving frequency of the display panel, wherein the gate low voltage is generated based on a predetermined power voltage having a predetermined power voltage level, wherein a generation cycle of the predetermined power voltage is controlled based on the driving frequency, wherein a frame period in which the pixel is driven includes an active period in which the data voltage is applied to the pixel and a blank period in which an applying of the data voltage is stopped, and wherein the predetermined power voltage is repeatedly generated during the active period and the blank period with a first generation cycle and a second generation cycle different from the first generation cycle, respectively.

2. The display device of claim 1, wherein when the driving frequency is higher than a reference driving frequency, the generation cycle is decreased.

3. The display device of claim 1, wherein when the driving frequency is lower than a reference driving frequency, the generation cycle is increased.

4. The display device of claim 1, wherein the voltage outputter includes:

a voltage generating block configured to receive an input power voltage and a cycle control signal, and output the predetermined power voltage based on the input power voltage and the cycle control signal; and a voltage converting block configured to output the gate low voltage based on the predetermined power voltage.

5. The display device of claim 4, wherein the input power voltage includes a first input power voltage and a second input power voltage, wherein the voltage generating block includes:

a first switching element including a first terminal which receives the first input power voltage and a second terminal connected to a first node;

a second switching element including a first terminal which receives a ground voltage and a second electrode connected to a second node;

a third switching element including a first terminal which receives the ground voltage and a second terminal connected to the first node;

a first capacitor including a first electrode connected to the first node and a second electrode connected to the second node;

a fourth switching element including a first terminal connected to the second node and a second terminal connected to a third node;

a fifth switching element including a first terminal which receives the second input power voltage and a second terminal connected to the third node;

a sixth switching element including a first terminal which receives the ground voltage and a second terminal connected to a fourth node;

a second capacitor including a first electrode connected to the third node and a second electrode connected to the fourth node;

a seventh switching element including a first terminal connected to the fourth node and a second terminal connected to a fifth node;

a third capacitor including a first electrode connected to the fifth node and a second electrode which receives the ground voltage, and wherein the fifth node outputs the predetermined power voltage.

6. The display device of claim 5, wherein a generation period in which the voltage generating block operates includes a first generation period and a second generation period, wherein in the first generation period, the first capacitor stores the first input power voltage, and the second capacitor stores the second input power voltage, wherein in the second generation period, the second node and the third node are connected, and the fourth node and the fifth node are connected, and wherein an absolute value of the predetermined power voltage is a sum of the first input power voltage and the second input power voltage.

7. The display device of claim 6, wherein the first input power voltage and the second input power voltage are positive voltages, and the predetermined power voltage is a negative voltage.

8. The display device of claim 6, wherein the generation cycle is a length of the generation period, and wherein the length of the generation period is changed based on the driving frequency.

9. The display device of claim 8, wherein when the driving frequency is increased, the length of the generation period is decreased.

10. The display device of claim 8, wherein when the driving frequency is decreased, the length of the generation period is increased.

11. The display device of claim 1, wherein the driving frequency includes a first driving frequency and a second driving frequency higher than the first driving frequency, wherein a frame period of the first driving frequency includes an active period in which the data voltage is applied and a blank period in which the applying of the data voltage is stopped, wherein a frame period of the second driving frequency includes the active period, and wherein the generation cycle has the first generation cycle in the active period, and the generation cycle has the second generation cycle longer than the first generation cycle in the blank period.

12. The display device of claim 11, wherein in the active period, an active signal has an activation level, and in the blank period, the active period has an inactivation level, wherein when the active signal has the activation level, the generation cycle has the first generation cycle, and wherein when the active signal has the inactivation level, the generation cycle has the second generation cycle.

13. The display device of claim 11, wherein in the active period, an active signal has an activation level, and in the blank period, the active period has an inactivation level, wherein the frame period of the first driving frequency includes a first period to a fourth period, wherein in the first period, the active signal has the activation level, and the generation cycle has the second generation cycle, wherein in the second period following the first period, the active signal has the activation level, and the generation cycle has the first generation cycle, wherein in the third period following the second period, the active signal has the inactivation level, and the generation cycle has the first generation cycle, and wherein in the fourth period following the third period, the active signal has the activation level, and the generation cycle has the second generation cycle.

14. A display device comprising:

a display panel including a pixel;

a gate driver configured to output a gate signal to the pixel;

a data driver configured to apply a data voltage to the display panel;

a voltage outputter configured to apply a gate high voltage and a gate low voltage to the gate driver; and a driving controller configured to control the gate driver, the data driver and the voltage outputter, wherein the gate signal is generated based on the gate high voltage and the gate low voltage, wherein a frame period in which the pixel is driven includes an active period in which the data voltage is applied to the pixel and a blank period in which an applying of the data voltage is stopped, wherein in the active period, a predetermined power voltage having a predetermined power voltage level is generated with a first generation cycle, and wherein in the blank period, the predetermined power voltage is generated with a second generation cycle longer than the first generation cycle, and wherein the predetermined power voltage is repeatedly generated during the active period and the blank period with the first generation cycle and the second generation cycle, respectively.

15. The display device of claim 14, wherein the voltage outputter includes:

a voltage generating block configured to receive an input power voltage and a cycle control signal, and output the predetermined power voltage based on the input power voltage and the cycle control signal; and a voltage converting block configured to output the gate low voltage based on the predetermined power voltage.

16. The display device of claim 15, wherein the input power voltage includes a first input power voltage and a second input power voltage, wherein the voltage generating block includes:

a first switching element including a first terminal which receives the first input power voltage and a second terminal connected to a first node;

a second switching element including a first terminal which receives a ground voltage and a second electrode connected to a second node;

a third switching element including a first terminal which receives the ground voltage and a second terminal connected to the first node;

a first capacitor including a first electrode connected to the first node and a second electrode connected to the second node;

a fourth switching element including a first terminal connected to the second node and a second terminal connected to a third node;

a fifth switching element including a first terminal which receives the second input power voltage and a second terminal connected to the third node;

a sixth switching element including a first terminal which receives the ground voltage and a second terminal connected to a fourth node;

a second capacitor including a first electrode connected to the third node and a second electrode connected to the fourth node;

a seventh switching element including a first terminal connected to the fourth node and a second terminal connected to a fifth node;

a third capacitor including a first electrode connected to the fifth node and a second electrode which receives the ground voltage, and wherein the fifth node outputs the predetermined power voltage.

17. The display device of claim 16, wherein a generation period in which the voltage generating block operates includes a first generation period and a second generation period, wherein in the first generation period, the first capacitor stores the first input power voltage, and the second capacitor stores the second input power voltage, wherein in the second generation period, the second node and the third node are connected, and the fourth node and the fifth node are connected, and wherein an absolute value of the predetermined power voltage is a sum of the first input power voltage and the second input power voltage.

18. The display device of claim 17, wherein the first input power voltage and the second input power voltage are positive voltages, and the predetermined power voltage is a negative voltage.

19. The display device of claim 14, wherein the frame period includes a first period to a fourth period, wherein in the first period, an active signal has an activation level, and a generation cycle of the predetermined power voltage has the second generation cycle, wherein in the second period following the first period, the active signal has the activation level, and the generation cycle has the first generation cycle, wherein in the third period following the second period, the active signal has an inactivation level, and the generation cycle has the first generation cycle, and wherein in the fourth period following the third period, the active signal has the activation level, and the generation cycle has the second generation cycle.

20. An electronic device comprising:

a display panel including a pixel;

a gate driver configured to output a gate signal to the pixel;

a data driver configured to apply a data voltage to the display panel;

a voltage outputter configured to apply a gate high voltage and a gate low voltage to the gate driver;

a driving controller configured to control the gate driver, the data driver and the voltage outputter based on an input control signal; and a processor configured to output the input control signal to the driving controller, wherein the gate signal is generated based on the gate high voltage and the gate low voltage, wherein the driving controller controls a driving frequency of the display panel, wherein the gate low voltage is generated based on a predetermined power voltage having a predetermined power voltage level, wherein a generation cycle of the predetermined power voltage is controlled based on the driving frequency, wherein a frame period in which the pixel is driven includes an active period in which the data voltage is applied to the pixel and a blank period in which an applying of the data voltage is stopped, and wherein the predetermined power voltage is repeatedly generated during the active period and the blank period with a first generation cycle and a second generation cycle different from the first generation cycle, respectively.

* * * * *